United States Patent
Tetrick

(10) Patent No.: US 7,895,397 B2
(45) Date of Patent: Feb. 22, 2011

(54) USING INTER-ARRIVAL TIMES OF DATA REQUESTS TO CACHE DATA IN A COMPUTING ENVIRONMENT

(75) Inventor: R. Scott Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 11/854,388

(22) Filed: Sep. 12, 2007

(65) Prior Publication Data

US 2009/0070527 A1 Mar. 12, 2009

(51) Int. Cl.
*G06F 12/00* (2006.01)
(52) U.S. Cl. ....................... 711/118; 711/138
(58) Field of Classification Search ............ 711/118, 711/138
See application file for complete search history.

(56) References Cited

U.S. PATENT DOCUMENTS

| | | | | |
|---|---|---|---|---|
| 6,457,103 | B1 * | 9/2002 | Challenger et al. | 711/133 |
| 6,681,309 | B2 * | 1/2004 | Szendy et al. | 711/173 |
| 2003/0084252 | A1 * | 5/2003 | Talagala | 711/135 |
| 2003/0236961 | A1 * | 12/2003 | Qiu et al. | 711/170 |
| 2006/0090040 | A1 * | 4/2006 | Eschmann | 711/143 |

* cited by examiner

*Primary Examiner*—Hashem Farrokh
(74) *Attorney, Agent, or Firm*—B. Delano Jordan; Jordan IP Law, PC

(57) ABSTRACT

A data caching method comprising monitoring read and write requests submitted for accessing target data in a first data block on a storage medium; identifying a sequence of access requests for target data as a first stream; and determining whether the first stream is suitable for direct disk access based on inter-arrival times of the read or write requests in the stream.

13 Claims, 3 Drawing Sheets

Sample Streams

| | Stream Size | Req Size | Starting LBA | Ending LBA | R/W | Duration | No of Reqs | Service Time | Disk Busy Time | BW | Variance | Stream Utilization |
|---|---|---|---|---|---|---|---|---|---|---|---|---|
| 1 | 1445.4 | 24 | 0x398d715 | 0x3c6022c | Read | 109.5504 | 23130 | 93.81205 | 68.39071 | 21.13427 | 0.000093 | 0.624285 |
| 2 | 1445.4 | 24 | 0x398d715 | 0x3c6022c | Read | 294.4493 | 92508 | 65.40159 | 40.4377 | 35.74357 | 0.000356 | 0.137333 |
| 3 | 563.3 | 128 | 0x41fadf3 | 0x431487a | Read | 115.5385 | 9016 | 84.51142 | 35.59079 | 15.82759 | 0.000547 | 0.308043 |
| 4 | 948 | 120 | 0x431487b | 0x44ee814 | Read | 192.9201 | 15175 | 141.0998 | 63.35792 | 14.96183 | 0.000554 | 0.328415 |
| 5 | 468.9 | 32 | 0x1fc9332 | 0x20b3a53 | Read | 16.11282 | 7506 | 15.69089 | 14.64812 | 32.01035 | 0.000007 | 0.909098 |
| 6 | 150.4 | 48 | 0x43c0043 | 0x440b35a | Read | 5.166363 | 2407 | 5.003076 | 4.999698 | 30.07916 | 0.000001 | 0.96774 |
| 7 | 210.2 | 120 | 0x20255ba | 0x208e731 | Read | 100.6052 | 3400 | 92.77671 | 24.43423 | 8.602013 | 0.002366 | 0.242873 |
| 8 | 64 | 8 | 0xaeace9 | 0xa5ace8 | Write | 5378.632 | 2502 | 38.92885 | 6.250339 | 10.23945 | 12.87199 | 0.001162 |
| 9 | 64 | 8 | 0xaeace9 | 0xa5acf0 | Write | 4055.506 | 2242 | 18.22171 | 6.060551 | 10.56074 | 9.165828 | 0.001494 |
| 10 | 64 | 8 | 0xaeace9 | 0xa5ace8 | Write | 9732.544 | 2711 | 22.46105 | 1.819264 | 35.17906 | 20.72633 | 0.000187 |
| 11 | 64 | 8 | 0xaeace9 | 0xa5ace8 | Write | 2143.185 | 1720 | 22.00676 | 3.196489 | 20.02197 | 3.495462 | 0.001491 |

Stream Size     Size of the stream in megabytes
Req Size     Length of the first request in the stream
Starting LBA     First LBA in the stream
Ending LBA     Last LBA in the stream
R/W     Read or write command for the stream
Duration     Total time duration of the stream
No of Reqs     Number of requests in the stream
Service Time     Total service time for the requests (the sum of the time from start to end of each transfer
Disk Busy Time     Total disk busy time (eliminated overlapping requests)
BW     Bandwidth of the stream
Variance     Statistical variance of the times from end of previous request to the beginning of the next request
Stream Utilization     Disk Busy Time divided by Duration

*FIG. 2*

USING INTER-ARRIVAL TIMES OF DATA REQUESTS TO CACHE DATA IN A COMPUTING ENVIRONMENT

FIELD OF INVENTION

This invention relates generally to caching in computing systems and, more particularly, to the use of inter-arrival times of data requests to determine cache policy.

BACKGROUND

In a computing system, the rate at which data is accessed from rotating media (e.g., hard disk drive, optical disk drive) (hereinafter "disk") is generally slower than the rate at which a processor processes the same data. Thus, despite a processor's capability to process data at higher rates, the disk's performance often slows down the overall system performance, since the processor can only process data as fast as the data can be retrieved from the disk.

A cache system may be implemented to at least partially reduce the disk performance bottleneck by storing selected data in a high-speed memory location designated as the disk cache. Then, whenever data is requested, the system will look for the requested data in the cache before accessing the disk. This implementation improves system performance since data can be retrieved from the cache much faster than from the disk.

Certain access patterns, however, may decrease the efficiency of the cache system. For example, applications that repeatedly flush or overwrite the contents of the cache without using any of the cached data may render the cache system useless. When such access patterns arise, it may be better to circumvent the cache and access the disk directly.

Streams may be used to detect regular access patterns where it may be better to access the disk directly instead of first looking in the disk cache. A stream is a sequential, time-ordered set of read or write requests. Each stream is associated with a request size. A stream's request size is the amount of data to be read or written by the first request in the stream, though this request size may change over the life of the stream.

Currently, a stream's request size is used to determine whether a stream is suitable for direct disk access. For example, a stream having a small request size may not be suitable for direct disk access because small requests tend to involve data that is accessed frequently and is desirable to be cached. On the other hand, a stream having a large request size may be suitable for direct disk access because large requests tend to involve data that is not accessed frequently and is not desirable to be cached.

Despite of the above, some streams (e.g., streams generated by applications that access the entire disk or a large portion of the disk, such as backup, virus scan or desktop search software) have small request sizes but are not good candidates for caching, because when data accessed by said streams is cached, the cached data is flushed before it can be used, rendering the cache system useless.

Such result is obviously undesirable. Therefore, systems and methods are needed that can overcome the above shortcomings.

BRIEF DESCRIPTION OF THE DRAWINGS

Embodiments of the invention are understood by referring to the figures in the attached drawings, as provided below.

FIG. 2 is a table listing information from sample streams, in accordance with one embodiment.

Features, elements, and aspects of the invention that are referenced by the same numerals in different figures represent the same equivalent, or similar features, elements, or aspects, in accordance with one or more embodiments.

DETAILED DESCRIPTION OF EXEMPLARY EMBODIMENTS

Figure 1:
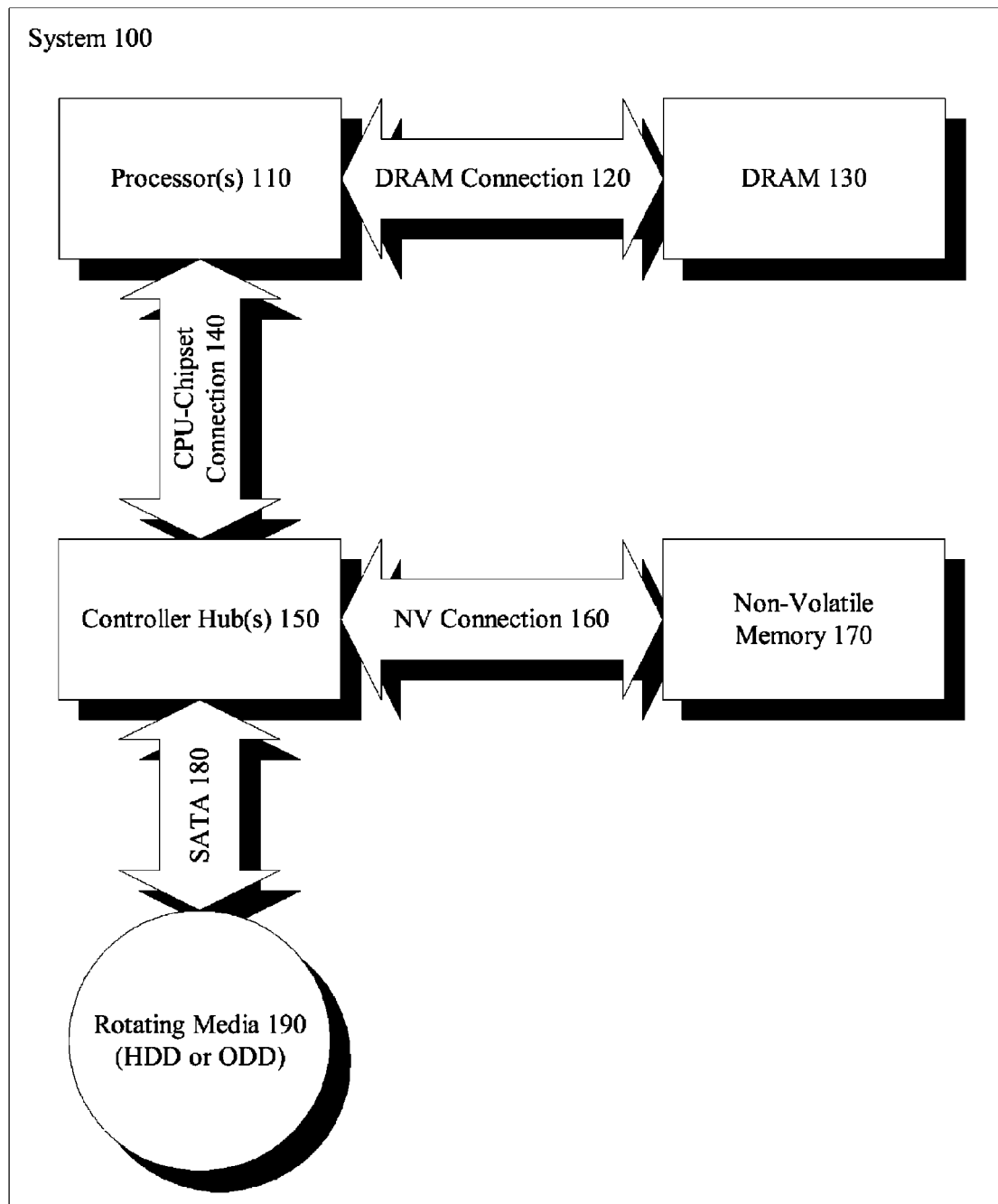
FIG. 1 is a block diagram of the system components in an exemplary computing system, in accordance with one embodiment.

The present disclosure is directed to systems and corresponding methods for caching data requested in streams.

In accordance with one embodiment, a method for using inter-arrival times of data requests to detect streams that are suitable for direct disk access is provided. The method comprises monitoring read and write requests submitted for accessing target data in a first data block on a storage medium; identifying a sequence of target data as a first stream; and determining whether the first stream is a suitable for direct disk access based on the inter-arrival times of the read or write requests in the stream. The storage medium may be a rotatable storage medium.

The method further comprises allowing the first stream to bypass the cache and directly access the storage medium, if the stream is suitable for direct disk access. The method also further comprises allowing the first stream to access the cache, if the stream is not suitable for direct disk access.

The variance of a stream's inter-arrival times may indicate whether a stream is suitable for direct disk access. Inter-arrival time is the time from the end of one request in the stream to the beginning of the next request in the stream. A high variance value may indicate that the stream will take a long time to complete and does not have a regular access pattern. The stream may be cached in response to determining that the stream has a high variance value. A low variance value, on the other hand, may indicate that the stream is made up of small requests and has a regular access pattern. The stream may circumvent the cache and directly access the storage medium in response to determining that the stream has a low variance value.

In accordance with one embodiment, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments, in addition to certain alternatives, are provided in further detail below with reference to the attached figures. The invention is not, however, limited to any particular embodiment enclosed.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Referring to FIG. 1, exemplary system 100 comprises one or more processors 110, dynamic random access memory (DRAM) 130, controller hub(s) 150, nonvolatile (NV) memory 170, and rotating media 190. Rotating media 190 may comprise a hard disk drive (HDD) or an optical disk drive (ODD) depending on implementation. A disk cache may be loaded into DRAM 130 (main system memory), in accordance with one embodiment, or NV memory 170, in accordance with another embodiment.

Processor(s) 110 may be connected to DRAM 130 by way of DRAM connection 120, for example, and processor(s) 110 may be connected to controller hub(s) 150 by way of chipset-cpu connection 140, for example. Controller hub(s) 150 may be connected to NV memory 170 by way of NV connection 160, for example, and to rotating media 190 by way of serial advanced technology attachment (SATA) 180, for example.

Inter-arrival times may be used to detect streams that are suitable for direct disk access and may circumvent the cache. Inter-arrival time refers to the time period lapsed from the end of one read or write request to the beginning of the next one. Statistical variance may be used to analyze inter-arrival times for a stream.

In accordance with one embodiment, FIG. 2 illustrates that streams with high inter-arrival time variance values take longer to complete. For example, sample streams 8-11 have relatively high variance values compared to the other sample streams. Streams 8-11 also have relatively long duration values. In other words, streams 8-11 access data at irregular intervals and therefore are not suitable for direct disk access. As discussed previously, streams that are suitable for direct disk access have regular access patterns that access small amounts of data at regular time intervals.

On the other hand, streams with low inter-arrival time variance values have regular access patterns. For example, sample streams 5 and 6 have relatively low inter-arrival time variance values compared to the other sample streams. Streams 5 and 6 also have relatively low service times combined with relatively high stream utilization. In other words, sample streams 5 and 6 are made up of small requests at regular intervals, which indicate a regular access pattern.

As provided earlier, streams with regular access patterns are suitable for direct disk access, as regular access patterns (e.g., commonly associated with applications such as virus scan, backup, and desktop search) have small request sizes but access the entire disk or a large portion of the disk without the need to access the same data again. Accordingly, loading the requested data into the cache will not interject any efficiency into the system, and, to the contrary, may slowdown the system's performance.

Figure 3:
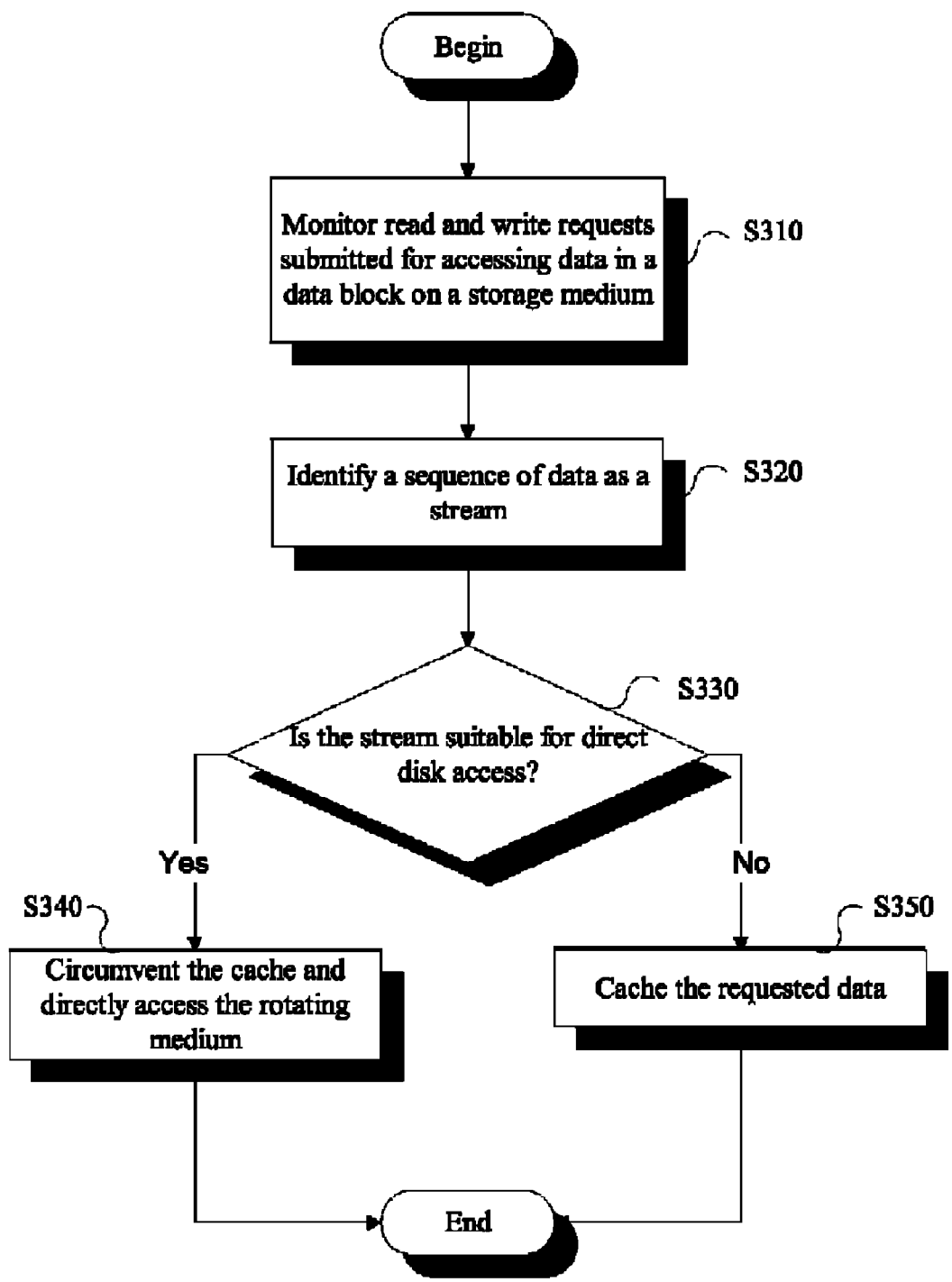
FIG. 3 is a flow diagram of a method for using inter-arrival times to detect streams that are suitable for direct disk access, in accordance with one embodiment.

As provided in more detail below, the above-noted principles and stream characteristics may be utilized to refine cache policy in the system of FIG. 1. Referring to FIG. 3, for example, cache policies may be determined by detecting streams that are suitable for direct disk access. In one embodiment, read and write requests submitted for accessing data on a storage medium (e.g., rotating media 190) are monitored (S310). Once a sequence of data, or a sequential, time-ordered set of read or write requests is identified as a stream (S320), it is determined if the stream is suitable for direct disk access (S330). If so, the stream may circumvent the cache and directly access the storage medium (S340). If the stream is not suitable for direct disk access, the requested data is cached (S350).

Referring back to FIG. 2, for example, a sequence of read requests may received (S310) and identified as sample stream 6 (S320). In one exemplary embodiment, the inter-arrival time variance for stream 6 may be used to determine whether stream 6 is suitable for direct disk access. The variance value is preferably calculated by taking the statistical variance of the inter-arrival times of each read request in stream 6 as the requests are being processed. Once a sufficient number of requests have been processed, the variance may be used to determine whether stream 6 is suitable for direct disk access (S330). Since stream 6's variance is relatively low, stream 6 is considered suitable for direct disk access and may circumvent the cache and directly access the rotating medium (S340). In addition, previously cached data from the requests that have already been processed may be removed from the cache since the data may never be accessed again from the cache.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections). In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A data caching method comprising:
   monitoring read and write requests submitted for accessing target data in a first data block on a storage medium;
   identifying a sequence of access requests for target data as a first stream; and
   determining whether the first stream is suitable for direct disk access based on inter-arrival times of the read or write requests in the stream for the purpose of determining a cache policy with respect to the target data, wherein a variance of inter-arrival times of requests in the stream indicates whether the first stream is suitable for direct disk access.

2. The method of claim 1, wherein the storage medium is a rotatable storage medium.

3. The method of claim 1, further comprising allowing the first stream to circumvent the cache and directly access the storage medium, in response to determining that the first stream is suitable for direct disk access.

4. The method of claim 1, further comprising caching the target data, in response to determining that the first stream is not suitable for direct disk access.

5. The method of claim 1, wherein inter-arrival time is the time from the end of one request in the first stream to the beginning of the next request in the first stream.

6. The method of claim 1, wherein a high variance value indicates that the first stream accesses data at irregular intervals and will take a long time to complete.

7. The method of claim 1, wherein the first stream is cached in response to determining that the first stream has a high variance value.

8. The method of claim 1, wherein a low variance value indicates that the first stream has a regular access pattern.

9. The method of claim 1, wherein the first stream circumvents the cache and directly accesses the storage medium in response to determining that the first stream has a low variance value.

10. A data caching system comprising:
   a logic unit for monitoring read and write requests submitted for accessing target data in a first data block on a storage medium;
   a logic unit for identifying a sequence of access requests for target data as a first stream; and
   a logic unit for determining whether the first stream is suitable for direct disk access based on inter-arrival times of the read or write requests in the stream for the purpose of determining a cache policy with respect to the target data, wherein a variance of inter-arrival times of requests in the stream indicates whether the first stream is suitable for direct disk access.

11. The system of claim 10, wherein the storage medium is a rotatable storage medium.

12. The system of claim 10, further comprising a logic unit for allowing the first stream to circumvent the cache and directly access the storage medium, in response to determining that the first stream is suitable for direct disk access.

13. The system of claim 10, further comprising a logic unit for caching the target data, in response to determining that the first stream is not suitable for direct disk access.

* * * * *